US012650085B1

(12) United States Patent
Sobanski et al.

(10) Patent No.: US 12,650,085 B1
(45) Date of Patent: Jun. 9, 2026

(54) CONTROL SYSTEM FOR OPEN ROTOR PROPULSION SYSTEM WITH ONE OR MORE SENSORS

(71) Applicant: RTX Corporation, Farmington, CT (US)

(72) Inventors: Jon E. Sobanski, Glastonbury, ME (US); Andrew E. Breault, Bolton, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/972,260

(22) Filed: Dec. 6, 2024

(51) Int. Cl.
　　*F01D 17/02* (2006.01)
　　*B64C 11/30* (2006.01)
　　　　　　(Continued)

(52) U.S. Cl.
　　CPC ............ *F01D 17/02* (2013.01); *B64C 11/303* (2013.01); *F01D 17/16* (2013.01); *F01D 21/003* (2013.01);
　　　　　　(Continued)

(58) Field of Classification Search
　　CPC ........ F01D 17/02; F01D 17/16; F01D 17/085; F01D 21/003; F01D 1/24;
　　　　　　(Continued)

(56) References Cited

U.S. PATENT DOCUMENTS 3,523,423 A * 8/1970 Young ...................... F02K 1/16
　　　　　　　　　　　　　　　　60/236
4,055,946 A * 11/1977 Sens .......................... F02C 9/16
　　　　　　　　　　　　　　　　60/39.23

(Continued)

FOREIGN PATENT DOCUMENTS

CA　　　　2793305 A1 * 12/2011 ............. F02K 3/072
EP　　　　4023859 A2 * 7/2022 ........... G01M 15/14

(Continued)

OTHER PUBLICATIONS

EP Search Report for EP Patent Application No. 25221271.7 dated Apr. 10, 2026.

*Primary Examiner* — Nathaniel E Wiehe
*Assistant Examiner* — Wayne A Lambert
(74) *Attorney, Agent, or Firm* — Getz Balich LLC

(57) ABSTRACT

An assembly is provided for an aircraft. This assembly includes a propulsion system and a control system. The propulsion system includes an open propulsor rotor and a turbine engine configured to drive rotation of the open propulsor rotor about an axis. The control system includes a first sensor, a second sensor and a controller in signal communication with the first sensor and the second sensor. The first sensor is configured to provide first sensor data indicative of a first environmental parameter. The second sensor is mounted to the propulsion system and is configured to provide second sensor data indicative of a second environmental parameter. The controller is configured to monitor and/or control operation of the propulsion system using the first sensor data. The controller is also configured to monitor the first sensor data using the second sensor data.

18 Claims, 8 Drawing Sheets

(51) Int. Cl.

| | |
|---|---|
| *F01D 17/16* | (2006.01) |
| *F01D 21/00* | (2006.01) |
| *F02C 9/20* | (2006.01) |
| *F01D 1/24* | (2006.01) |
| *F01D 17/08* | (2006.01) |

(52) U.S. Cl.
CPC ................. *F02C 9/20* (2013.01); *F01D 1/24* (2013.01); *F01D 17/085* (2013.01); *F05D 2220/323* (2013.01); *F05D 2260/70* (2013.01); *F05D 2270/312* (2013.01); *F05D 2270/313* (2013.01)

(58) Field of Classification Search
CPC .......... F05D 2220/323; F05D 2260/70; F05D 2260/312; F05D 2260/313; B64C 11/303; F02C 9/20
See application file for complete search history.

(56) References Cited

U.S. PATENT DOCUMENTS

| | | | | |
|---|---|---|---|---|
| 4,351,150 | A * | 9/1982 | Schulze | ................. F02C 7/047 |
| | | | | 60/39.83 |
| 4,772,180 | A * | 9/1988 | Walker | .................... F02K 3/072 |
| | | | | 416/27 |
| 4,872,807 | A * | 10/1989 | Thompson | .............. F01D 17/08 |
| | | | | 415/118 |
| 5,072,580 | A * | 12/1991 | Patterson | .................. F02K 1/16 |
| | | | | 701/100 |
| 5,436,826 | A * | 7/1995 | O'Flarity | ............. G05D 1/0077 |
| | | | | 701/100 |
| 5,775,089 | A * | 7/1998 | Skarvan | .................. F01D 17/08 |
| | | | | 60/39.282 |
| 7,275,361 | B2 * | 10/2007 | Muramatsu | .............. F02C 9/28 |
| | | | | 60/803 |
| 8,452,515 | B2 * | 5/2013 | Drohan | ................... F01D 17/08 |
| | | | | 701/99 |
| 10,309,249 | B2 * | 6/2019 | Tezuka | .................... F01D 21/06 |
| 10,370,086 | B2 | 8/2019 | Vion | |
| 11,834,196 | B2 | 12/2023 | Adibhatla | |
| 11,891,919 | B2 | 2/2024 | Deneuve | |
| 12,055,095 | B1 | 8/2024 | Duranleau-Hendrickx | |
| 2003/0024235 | A1 * | 2/2003 | Pisano | ..................... F02C 9/46 |
| | | | | 60/204 |
| 2005/0222822 | A1 * | 10/2005 | Muramatsu | ............. F01D 17/02 |
| | | | | 73/112.01 |
| 2009/0266150 | A1 * | 10/2009 | Novis | .................. F01D 21/003 |
| | | | | 73/112.01 |
| 2011/0005296 | A1 * | 1/2011 | Muramatsu | ........... G01D 3/022 |
| | | | | 73/1.37 |
| 2011/0079015 | A1 * | 4/2011 | Geis | .......................... F02C 9/22 |
| | | | | 701/100 |
| 2015/0142216 | A1 * | 5/2015 | Tillman | .................. F01D 11/20 |
| | | | | 701/3 |
| 2015/0219516 | A1 * | 8/2015 | Grice | ....................... F17D 3/00 |
| | | | | 701/33.9 |
| 2016/0146118 | A1 * | 5/2016 | Wichmann | ............ F01D 21/003 |
| | | | | 701/100 |
| 2016/0167792 | A1 * | 6/2016 | Greenberg | ............. B64C 15/20 |
| | | | | 415/116 |
| 2017/0107914 | A1 | 4/2017 | Lu | |
| 2018/0051585 | A1 * | 2/2018 | Xiong | .................. F01D 21/003 |
| 2021/0096562 | A1 * | 4/2021 | Ruckel | ............... B64C 29/0033 |
| 2021/0108595 | A1 * | 4/2021 | Khalid | ................. F04D 29/563 |
| 2023/0150681 | A1 | 5/2023 | Ramakrishnan | |
| 2024/0052755 | A1 | 2/2024 | Cafaro | |

FOREIGN PATENT DOCUMENTS

| | | | | |
|---|---|---|---|---|
| FR | | 2972710 B1 | 9/2014 | |
| FR | | 3134148 A1 * | 10/2023 | .............. F02K 5/00 |

* cited by examiner

600

Provide first sensor data
602

Provide second sensor data
604

Control propulsion system operation using the first sensor data
606

Monitor the first sensor data using the second sensor data
608

Monitor propulsion system operation using the first sensor data and/or the second sensor data
610

CONTROL SYSTEM FOR OPEN ROTOR PROPULSION SYSTEM WITH ONE OR MORE SENSORS

BACKGROUND OF THE DISCLOSURE

1. Technical Field

This disclosure relates generally to an aircraft and, more particularly, to an aircraft with open rotor propulsion system (s).

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft. This assembly includes a propulsion system and a control system. The propulsion system includes an open propulsor rotor and a turbine engine configured to drive rotation of the open propulsor rotor about an axis. The control system includes a first sensor, a second sensor and a controller in signal communication with the first sensor and the second sensor. The first sensor is configured to provide first sensor data indicative of a first environmental parameter. The second sensor is mounted to the propulsion system and is configured to provide second sensor data indicative of a second environmental parameter. The controller is configured to monitor and/or control operation of the propulsion system using the first sensor data. The controller is also configured to monitor the first sensor data using the second sensor data.

According to another aspect of the present disclosure, another assembly is provided for an aircraft. This assembly includes a propulsion system and a control system. The propulsion system includes an open propulsor rotor and a turbine engine configured to drive rotation of the open propulsor rotor about an axis. The control system includes a first sensor, a second sensor and a controller in signal communication with the first sensor and the second sensor. The first sensor is configured to provide first sensor data indicative of a first environmental parameter. The second sensor is mounted to the propulsion system and is configured to provide second sensor data indicative of a second environmental parameter. The controller is configured to control operation of the propulsion system during a first mode based on the first sensor data. The controller is configured to control the operation of the propulsion system during a second mode based on the second sensor data as a replacement for the first sensor data.

According to still another aspect of the present disclosure, another assembly is provided for an aircraft. This assembly includes a propulsion system and a control system. The propulsion system includes an open propulsor rotor, an open guide vane structure and a turbine engine. The open guide vane structure is axially next to the open propulsor rotor. The turbine engine is configured to drive rotation of the open propulsor rotor about an axis. The control system includes a sensor and a controller in signal communication with the sensor. The sensor is configured to provide sensor data indicative of an environmental parameter external to the propulsion system. The controller is configured to monitor and/or control operation of the propulsion system using the sensor data. The sensor is mounted with the propulsion system at a first location or a second location. The first location is axially between the open propulsor rotor and the open guide vane structure. The open propulsor rotor is axially between the second location and the open guide vane structure.

The control system may be configured such that: the first sensor is arranged remote from a stream of air propelled by the open propulsor rotor; and/or the second sensor is exposed to the stream of air propelled by the open propulsor rotor.

The controller may be configured to identify a fault in the first sensor data using the second sensor data.

The controller may also be configured to monitor and/or control operation of the propulsion system using the second sensor data instead of the first sensor data when the fault is identified in the first sensor data.

The controller may be configured to: monitor and/or control operation of the propulsion system using the first sensor data during a first mode; and monitor and/or control operation of the propulsion system using the second sensor data during a second mode.

The first environmental parameter may be indicative of a first air pressure outside of the propulsion system. The second environmental parameter may be indicative of a second air pressure outside of the propulsion system.

The first environmental parameter may be indicative of a first air temperature outside of the propulsion system. The second environmental parameter may be indicative of a second air temperature outside of the propulsion system.

The first environmental parameter may be a first free stream environmental parameter outside of the propulsion system.

The second environmental parameter may be a second free stream environmental parameter outside of the propulsion system.

The second environmental parameter may be a propulsor stream environmental parameter of a stream of air propelled by the open propulsor rotor outside of the propulsion system.

The open propulsor rotor may include a plurality of open propulsor blades. The propulsion system may also include an actuation system configured to change a pitch of at least one of the open propulsor blades. The controller may be configured to control operation of the actuation system using the first sensor data.

The propulsion system may also include an open guide vane structure axially next to the open propulsor rotor.

The open guide vane structure may be downstream of the open propulsor rotor.

The open guide vane structure may include a plurality of open guide vanes. The propulsion system may also include an actuation system configured to change a pitch of at least one of the open guide vanes. The controller may be configured to control operation of the actuation system using the first sensor data.

The turbine engine may include a plurality of stator vanes and an actuation system. The actuation system may be configured to change a pitch of at least one of the stator vanes. The controller may be configured to control operation of the actuation system using the first sensor data.

The controller may be configured to detect icing conditions using the first sensor data and/or the second sensor data.

The propulsion system may also include a nose cone axially next to and upstream of the open propulsor rotor. The second sensor may be mounted with the nose cone.

The propulsion system may also include an open guide vane structure axially next to the open propulsor rotor. The second sensor may be located axially between the open propulsor rotor and the open guide vane structure.

The first environmental parameter may be an environmental parameter located remote from the propulsion system.

The assembly may also include an airframe. The propulsion system may be mounted to the airframe. The first sensor may be mounted with the airframe remote from the propulsion system.

The assembly may also include a pylon. The propulsion system may be mounted to the pylon. The first sensor may be mounted with the pylon.

The assembly may also include an airframe, and the airframe may include a fuselage. The propulsion system may be mounted to the airframe. The first sensor may be mounted with the fuselage.

The assembly may also include an airframe, and the airframe may include an airfoil. The propulsion system may be mounted to the airframe. The first sensor may be mounted with the airfoil.

The assembly may also include an airframe, and the airframe may include a fuselage and an airfoil. The propulsion system may be mounted to the airframe. The first sensor may be mounted with the fuselage or the airfoil.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
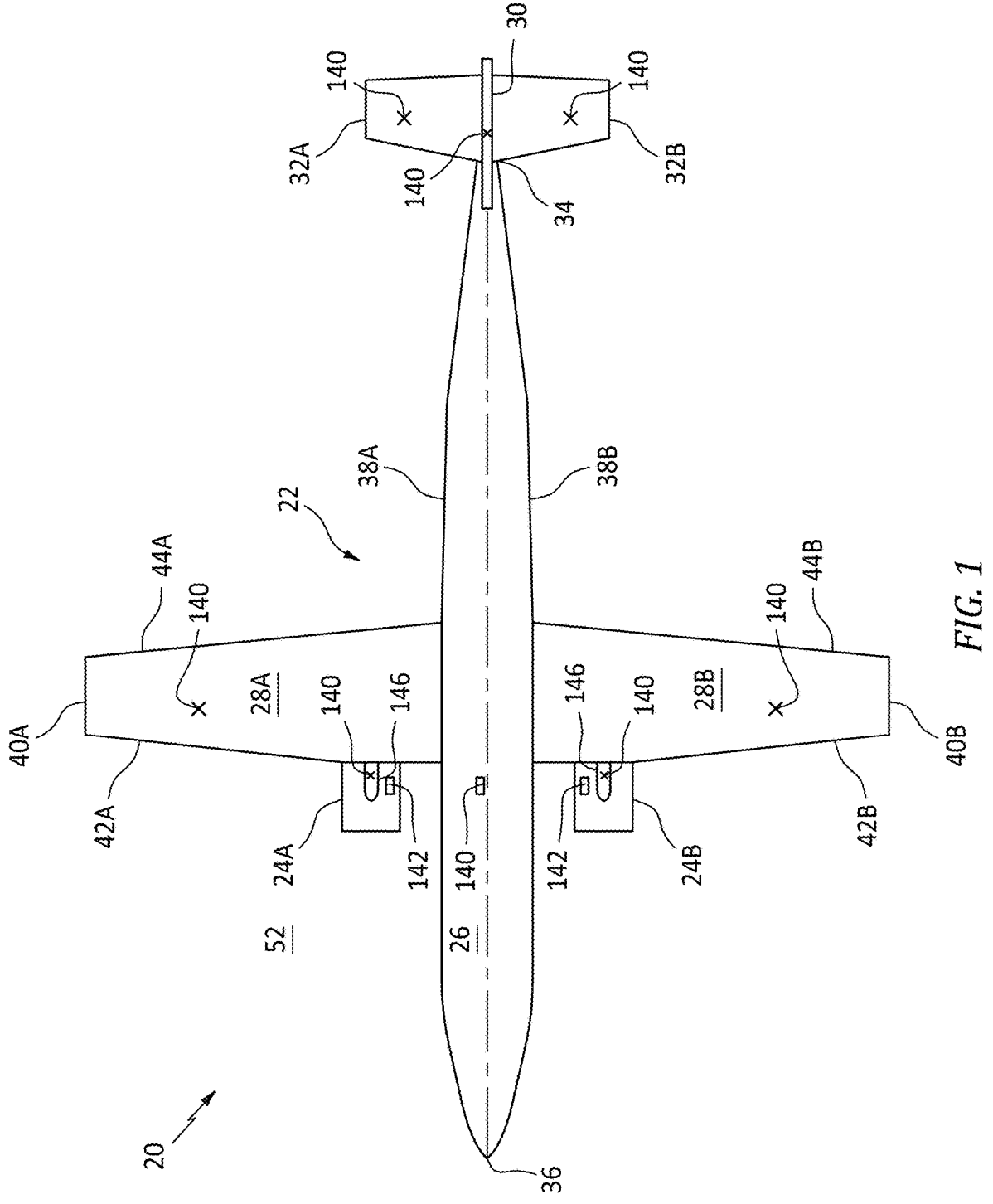
FIG. 1 is a schematic illustration of an aircraft with multiple propulsion systems mounted to wings of the aircraft.

FIG. 1 is a schematic illustration of an aircraft 20. This aircraft 20 may be an airplane, a drone (e.g., an unmanned aerial vehicle (UAV)), or any other manned or unmanned aerial vehicle or system. The aircraft 20 includes an aircraft airframe 22 and one or more aircraft propulsion systems 24A and 24B (generally referred to as "24"); e.g., a pair of companion aircraft propulsion systems.

The aircraft airframe 22 of FIG. 1 includes an aircraft fuselage 26 and one or more aircraft wings 28A and 28B (generally referred to as "28"). This aircraft airframe 22 may also include one or more aircraft stabilizers, such as at least one vertical stabilizer 30 and one or more horizontal stabilizers 32A and 32B (generally referred to as "32") arranged at (e.g., on, adjacent or proximate) an aft, downstream tail end 34 of the aircraft fuselage 26. However, in other embodiments, it is contemplated one or more of the aircraft stabilizers 30, 32A and/or 32B may be omitted where, for example, the aircraft is alternatively configured as a blended wing aircraft.

The aircraft fuselage 26 extends longitudinally along a longitudinal centerline of the aircraft airframe 22 and its aircraft fuselage 26 from a forward, upstream nose end 36 of the aircraft airframe 22 and its aircraft fuselage 26 to the fuselage tail end 34. The aircraft fuselage 26 extends laterally between and to opposing lateral sides 38A and 38B (generally referred to as "38") of the aircraft fuselage 26.

The aircraft wings 28A and 28B are arranged to the opposing lateral sides 38A and 38B of the aircraft fuselage 26. The first aircraft wing 28A of FIG. 1, for example, is connected to the aircraft fuselage 26 at the fuselage first side 38A. The second aircraft wing 28B is connected to the aircraft fuselage 26 at the fuselage second side 38B. The aircraft fuselage 26 of FIG. 1 is thereby located laterally between the first aircraft wing 28A and the second aircraft wing 28B. Each of these aircraft wings 28A and 28B projects spanwise out from the aircraft fuselage 26 to a tip 40A, 40B of the respective aircraft wing 28A, 28B. Each of the aircraft wings 28A and 28B extends longitudinally between and to a leading edge 42A, 42B of the respective aircraft wing 28A, 28B and a trailing edge 44A, 44B of the respective aircraft wing 28A, 28B.

The aircraft propulsion systems 24A and 24B of FIG. 1 are arranged to the opposing lateral sides 38A and 38B of the aircraft fuselage 26. The first aircraft propulsion system 24A of FIG. 1, for example, is mounted to the first aircraft wing 28A. The second aircraft propulsion system 24B is mounted to the second aircraft wing 28B. The aircraft fuselage 26 of FIG. 1 is thereby located laterally between the first aircraft propulsion system 24A and the second aircraft propulsion system 24B. The present disclosure, however, is not limited to such an exemplary arrangement. For example, referring to FIG. 2, the first aircraft propulsion system 24A may alternatively be mounted to the aircraft fuselage 26 at the fuselage first side 38A. The second aircraft propulsion system 24B may alternatively be mounted to the aircraft fuselage 26 at the fuselage second side 38B.

Figure 3:
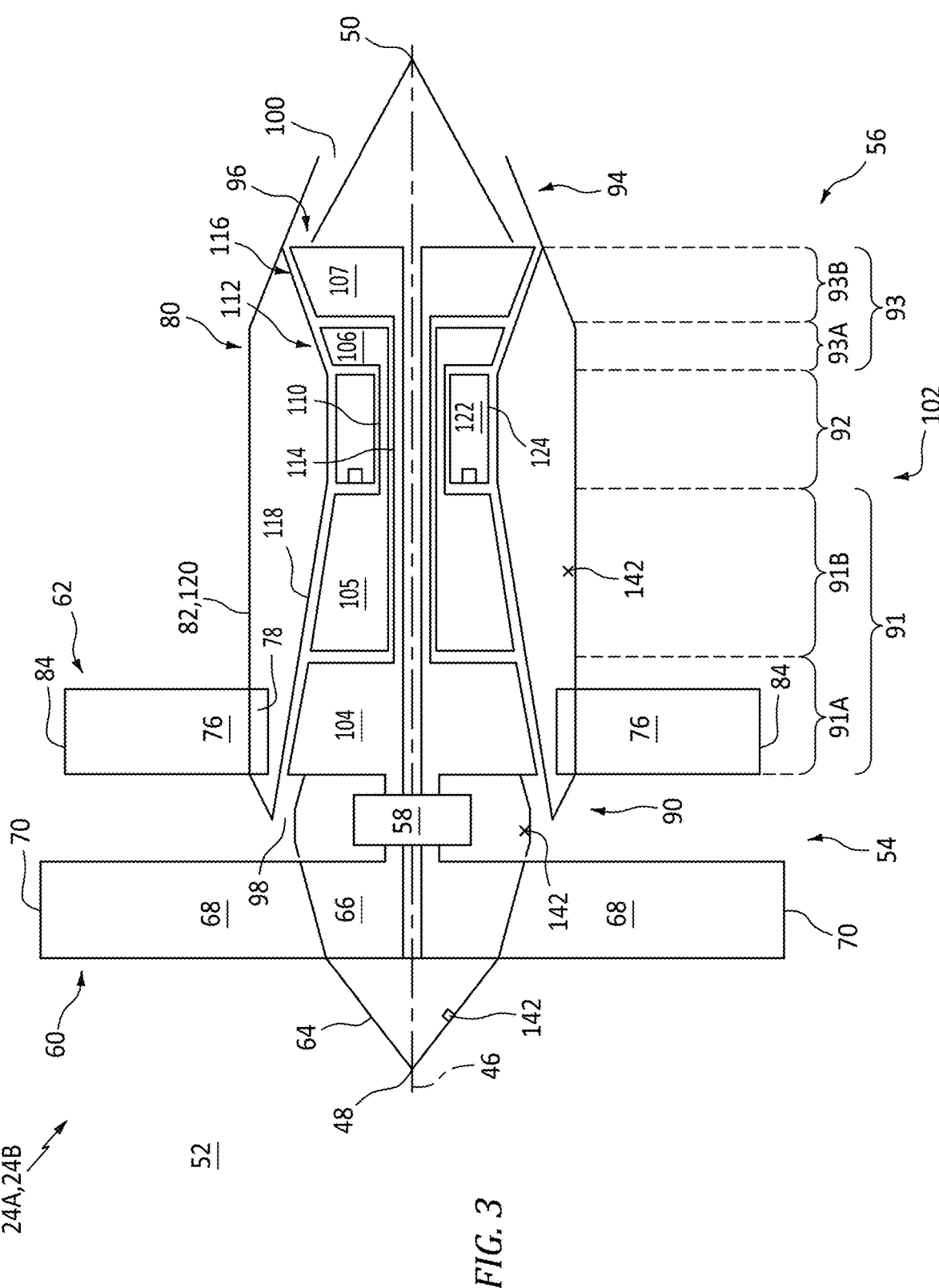
FIG. 3 is a schematic illustration of an exemplary one of the propulsion systems.

Referring to FIG. 3, each aircraft propulsion system 24 extends axially along an axis 46 between an upstream, forward end 48 of the aircraft propulsion system 24 and a downstream, aft end 50 of the aircraft propulsion system 24. The propulsion system axis 46 may be a centerline axis of the respective aircraft propulsion system 24 and/or a centerline axis of one or more members of the respective aircraft propulsion system 24. The propulsion system axis 46 may also or alternatively be a rotational axis of one or more members of the respective aircraft propulsion system 24.

Each aircraft propulsion system 24 may be configured as an open rotor propulsion system with a single open rotor and swirl recovery vane (SRV) architecture. Herein, the term "open" may describe a propulsion system section and/or a propulsion system component which is open to an environment 52 (e.g., an ambient environment) external to the aircraft propulsion system 24 and, more generally, the aircraft 20. The aircraft propulsion system 24 of FIG. 3, for example, includes an open rotor propulsion section 54, a gas turbine engine 56 and a geartrain 58.

The propulsion section 54 of FIG. 3 includes an open propulsor rotor 60 and an open guide vane structure 62. These propulsion section members 60 and 62 are un-ducted and unshrouded components of the aircraft propulsion system 24 and its propulsion section 54. However, in some embodiments, the open guide vane structure 62 may be a shrouded component of the aircraft propulsion system 24. In such embodiments, the open guide van structure 62 may be an un-ducted component including a shroud at a distal tip 84. The propulsion section 54 of FIG. 3 also includes a nose cone 64 disposed at (e.g., on, adjacent or proximate) the propulsion system forward end 48. Briefly, this nose cone 64 may be configured as a spinner which is rotatable with the propulsor rotor 60 about the propulsion system axis 46. Alternatively, the nose cone 64 may be configured as a stationary structure of the propulsion section 54.

The propulsor rotor 60 includes a rotor base 66 (e.g., a disk or a hub) and a plurality of open propulsor blades 68 (e.g., airfoils). The propulsor blades 68 are arranged and may be equispaced circumferentially about the rotor base 66 and the propulsion system axis 46 in an array; e.g., a circular array. Each of the propulsor blades 68 is connected to (e.g., formed integral with or otherwise attached to) the rotor base 66. Each of the propulsor blades 68 projects spanwise along a span line of the respective propulsor blade 68 (e.g., radially relative to the propulsion system axis 46) out from an exterior surface of the rotor base 66, into the external environment 52, to an unshrouded distal tip 70 of the respective propulsor blade 68. Each propulsor blade 68 is thereby configured as an un-ducted and unshrouded propulsor blade which is exposed to (e.g., disposed in) the surrounding external environment 52.

Figure 4:
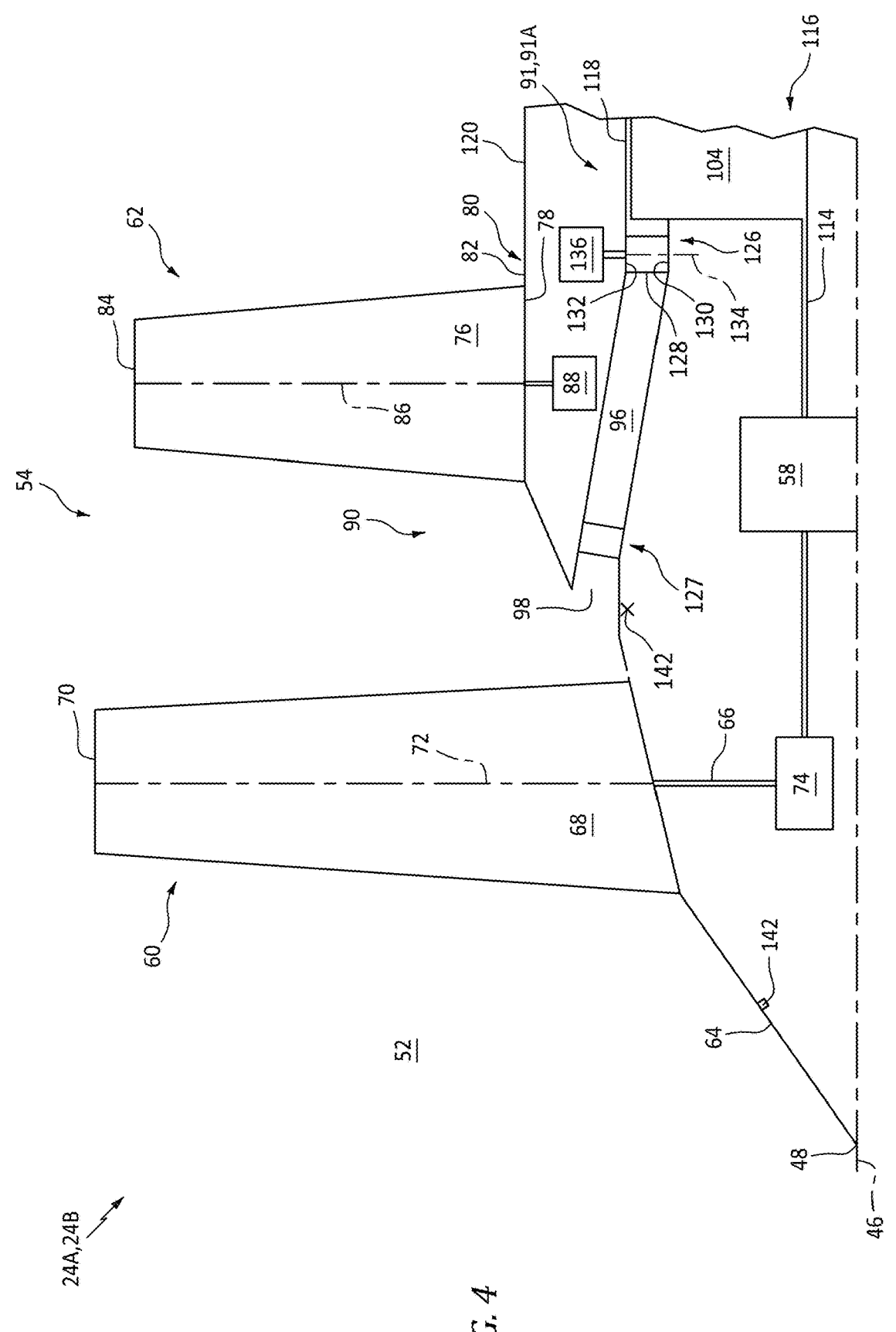
FIG. 4 is a schematic illustration of a forward portion of the propulsion system of FIG. 3.

Referring to FIG. 4, each propulsor blade 68 may be configured to pivot about a respective blade pivot axis 72. This blade pivot axis 72 extends radially relative to the propulsion system axis 46. The blade pivot axis 72 of FIG. 4, for example, is arranged perpendicular to the propulsion system axis 46 when viewed, for example, in a longitudinal reference plane parallel to (e.g., including) the propulsion system axis 46; e.g., the plane of FIG. 4. Each propulsor blade 68 of FIG. 4 is operatively coupled with a blade actuation system 74. This blade actuation system 74 is configured to pivot each propulsor blade 68 about its own respective blade pivot axis 72. By pivoting each propulsor blade 68 about its blade pivot axis 72, a pitch of the respective propulsor blade 68 may be changed. Note, while the blade pivot axis 72 is shown in FIG. 4 as being perpendicular to the propulsion system axis 46, it is contemplated this blade pivot axis 72 may or may not be coincident with the propulsion system axis 46. Moreover, it is contemplated each blade pivot axis 72 may alternatively be angularly offset from the propulsion system axis 46 by an acute angle or an obtuse angle when viewed, for example, in the longitudinal reference plane. Of course, it is contemplated some or all of the propulsor blades 68 may be alternatively moved to change the propulsor blade pitch. Moreover, it is contemplated some or all of the propulsor blades 68 may alternatively be fixed pitch propulsor blades in other embodiments.

The guide vane structure 62 of FIG. 3 includes a plurality of open exit guide vanes 76 (e.g., airfoils) that are arranged and may be equispaced circumferentially about the propulsion system axis 46 in an array; e.g., a circular array. This guide vane structure 62 and its guide vanes 76 are arranged axially next to (e.g., adjacent) the propulsor rotor 60 and its propulsor blades 68. The guide vane structure 62 and its guide vanes 76 of FIG. 3, for example, are arranged downstream of the propulsor rotor 60 and its propulsor blades 68, without (e.g., any) other elements axially therebetween to obstruct, turn and/or otherwise influence the air propelled by the propulsor rotor 60 to the guide vane structure 62 for example. Each of the guide vanes 76 of FIG. 3 is coupled to a support structure 78 of a stationary housing structure 80 for the aircraft propulsion system 24. This support structure 78 may be configured as or otherwise include a support frame, a case and/or another fixed structure of the housing structure 80. Each of the guide vanes 76 projects spanwise along a span line of the respective guide vane 76 (e.g., radially relative to the propulsion system axis 46) out from an exterior surface 82 of the housing structure 80, into the external environment 52, to the distal tip 84 of the respective guide vane 76, which may be unshrouded (as illustrated in FIG. 3) or shrouded. Here, the exterior surface 82 radially borders the external environment 52 and forms an exterior aerodynamic flow surface of the aircraft propulsion system 24. Each guide vane 76 is thereby configured as an un-ducted and unshrouded guide vane which is exposed to (e.g., disposed in) the surrounding external environment 52.

Referring to FIG. 4, each guide vane 76 may be configured to pivot about a respective guide vane pivot axis 86. This guide vane pivot axis 86 extends radially relative to the propulsion system axis 46. The guide vane pivot axis 86 of FIG. 4, for example, is arranged perpendicular to the propulsion system axis 46 when viewed, for example, in the longitudinal reference plane. Each guide vane 76 of FIG. 4 is operatively coupled with a guide vane actuation system 88, which guide vane actuation system 88 may be discrete from or integrated as part of the blade actuation system 74. The guide vane actuation system 88 is configured to pivot each guide vane 76 about its own respective guide vane pivot axis 86. By pivoting each guide vane 76 about its guide vane pivot axis 86, a pitch of the respective guide vane 76 may be changed. Note, while the guide vane pivot axis 86 is shown in FIG. 4 as being perpendicular to the propulsion system axis 46, it is contemplated this guide vane pivot axis 86 may or may not be coincident with the propulsion system axis 46. Moreover, it is contemplated each guide vane pivot axis 86 may alternatively be angularly offset from the propulsion system axis 46 by an acute angle or an obtuse angle when viewed, for example, in the longitudinal reference plane. Of course, it is contemplated some or all of the guide vanes 76 may be alternatively moved to change the guide vane pitch. Moreover, it is contemplated some or all of the guide vanes 76 may alternatively be fixed pitch guide vanes in other embodiments.

Referring to FIG. 3, the turbine engine 56 includes an inlet section 90, a compressor section 91, a combustor section 92, a turbine section 93 and an exhaust section 94. The compressor section 91 of FIG. 3 includes a low pressure compressor (LPC) section 91A and a high pressure compressor (HPC) section 91B. The turbine section 93 of FIG. 3 includes a high pressure turbine (HPT) section 93A and a low pressure turbine (LPT) section 93B. The turbine engine 56 also includes an (e.g., annular) engine flowpath 96 which extends longitudinally through the aircraft propulsion system 24 of FIG. 3 and its turbine engine 56 from an (e.g., annular) airflow inlet 98 into the engine flowpath 96 to a (e.g., annular) combustion products exhaust 100 from the engine flowpath 96. The flowpath inlet 98 is also an airflow inlet into the aircraft propulsion system 24 of FIG. 3 and its turbine engine 56. The flowpath exhaust 100 is also a combustion products exhaust from the aircraft propulsion system 24 of FIG. 3 and its turbine engine 56. At least (or only) the LPC section 91A, the HPC section 91B, the combustor section 92, the HPT section 93A and the LPT section 93B collectively form a core 102 (e.g., a gas generator) of the turbine engine 56.

Each of the engine sections 91A, 91B, 93A and 93B includes a respective bladed rotor 104-107; e.g., a ducted and/or shrouded engine rotor. Each of these engine rotors 104-107 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 96. Each of the rotor blades is connected to the respective rotor base. Each of the rotor blades projects radially (e.g., spanwise) out from the respective rotor base into the engine flowpath 96 and to a distal tip of the respective rotor blade.

The HPC rotor 105 is coupled to and rotatable with the HPT rotor 106. The HPC rotor 105 of FIG. 3, for example, is connected to the HPT rotor 106 by a high speed shaft 110. At least (or only) the HPC rotor 105, the HPT rotor 106 and the high speed shaft 110 collectively form a high speed rotating assembly 112; e.g., a high speed spool of the engine core 102. This high speed rotating assembly 112 of FIG. 3 and its members 105, 106 and 110 are rotatable about the propulsion system axis 46. However, in other embodiments, the high speed rotating assembly 112 and its members 105, 106 and 110 may alternatively be rotatable about another rotational axis which is (e.g., laterally and/or angularly) offset from the rotational axis of the propulsor rotor 60.

The LPC rotor 104 is coupled to and rotatable with the LPT rotor 107. The LPC rotor 104 of FIG. 3, for example, is connected to the LPT rotor 107 by a low speed shaft 114. At least (or only) the LPC rotor 104, the LPT rotor 107 and the low speed shaft 114 collectively form a low speed rotating assembly 116; e.g., a low speed spool of the engine core 102. This low speed rotating assembly 116 of FIG. 3 and its members 104, 107 and 114 are rotatable about the propulsion system axis 46. However, in other embodiments, the low speed rotating assembly 116 and its members 104, 107 and 114 may alternatively be rotatable about another rotational axis which is (e.g., laterally and/or angularly) offset from the rotational axis of the propulsor rotor 60.

The low speed rotating assembly 116 is coupled to the propulsor rotor 60 through the geartrain 58. This geartrain 58 is disposed between and operatively couples the propulsor rotor 60 to the low speed rotating assembly 116 and its LPT rotor 107. With this arrangement, the propulsor rotor 60 may rotate at a different (e.g., slower) rotational speed than the low speed rotating assembly 116 and its LPT rotor 107. Depending on the specific configuration of the geartrain 58, the propulsor rotor 60 and the low speed rotating assembly 116 may rotate in a common (the same) direction about the propulsion system axis 46 or in opposite directions about the propulsion system axis 46. Of course, in other embodiments, it is contemplated the geartrain 58 may be omitted to provide a direct-drive drivetrain between the low speed rotating assembly 116 and the propulsor rotor 60.

The engine sections 90-94 may be arranged sequentially along the propulsion system axis 46 and are housed within and/or formed by the housing structure 80. This housing structure 80 includes an engine case 118 (e.g., a gas generator case) and a nacelle 120. The engine case 118 houses one or more of the engine sections 91A-93B; e.g., the engine core 102. The engine case 118 of FIG. 3, for example, extends axially along (e.g., axially overlaps) and extends circumferentially about (e.g., circumscribes) the engine sections 91A-93B and their respective bladed rotors 104-107. The engine case 118 may also house the geartrain 58. The nacelle 120 houses and provides an aerodynamic cover over the engine case 118. An exterior wall of the nacelle 120 of FIG. 3, for example, is disposed radially outboard of, extends axially along (e.g., axially overlaps) and extends circumferentially about (e.g., circumscribes) the engine core 102 and its engine case 118. This nacelle wall may at least partially or completely form the exterior surface 82. With the foregoing arrangement, the bladed rotors 104-107 are disposed within the housing structure 80. By contrast, the propulsor rotor 60 and the guide vane structure 62 are disposed at least partially (or completely) outside of the housing structure 80.

During operation of the aircraft propulsion system 24 of FIG. 3, ambient air within the external environment 52 is propelled by the rotating propulsor rotor 60 in the downstream, aft direction towards the propulsion system aft end 50. A major portion (e.g., more than 50%) of this air bypasses the turbine engine 56 to provide forward thrust while a minor portion (e.g., less than 50%) of the air flows into the turbine engine 56. For example, an outer propulsor stream of the air propelled by the rotating propulsor rotor 60 flows axially across the guide vane structure 62 and outside of the housing structure 80 and its exterior surface 82; e.g., along an exterior of the nacelle 120. The guide vane structure 62 conditions (e.g., straightens out, de-swirls, etc.) the outer propulsor stream of air within the external environment 52 to enhance the forward thrust. By contrast, an inner propulsor stream of the air propelled by the rotating propulsor rotor 60 may bypass the guide vane structure 62 and enter the turbine engine 56 and its engine flowpath 96 through the flowpath inlet 98. The air entering the engine flowpath 96 through the flowpath inlet 98 may be referred to as "core air".

The core air is compressed by the LPC rotor 104 and the HPC rotor 105 and directed into a combustion chamber 122 (e.g., an annular combustion chamber) of a combustor 124 (e.g., an annular combustor) in the combustor section 92. Fuel is injected into the combustion chamber 122 by one or more fuel injectors and mixed with the compressed core air to provide a fuel-air mixture. This fuel-air mixture is ignited and combustion products thereof flow through and sequentially drive rotation of the HPT rotor 106 and the LPT rotor 107. The rotation of the HPT rotor 106 and the LPT rotor 107 respectively drive rotation of the HPC rotor 105 and the LPC rotor 104 and, thus, compression of the core air. The rotation of the LPT rotor 107 also drives the rotation of the propulsor rotor 60 through the geartrain 58. The turbine engine 56 and its low speed rotating assembly 116 thereby power operation of (e.g., drive rotation of) the propulsor rotor 60 during aircraft propulsion system operation.

The engine flowpath 96 of FIG. 3 extends longitudinally from the flowpath inlet 98, sequentially through the inlet section 90, the LPC section 91A, the HPC section 91B, the combustor section 92, the HPT section 93A, the LPT section 93B and the exhaust section 94, to the flowpath exhaust 100. The engine flowpath 96 of FIG. 3 is configured such that the core air and the combustion products generally flow in the aft, downstream direction towards the propulsion system aft end 50. The core air and the combustion products thereby flow along with the ambient air propelled by the rotating propulsor rotor 60 in a common axial direction—the downstream, aft direction. The turbine engine 56 of the present disclosure, however, is not limited to such an exemplary common flow engine arrangement. For example, the engine flowpath 96 may alternatively be configured such that the core air and the combustion products generally flow in a forward, upstream direction towards the propulsion system forward end 48. The core air and the combustion products may thereby flow in an opposite direction as the ambient air propelled by the rotating propulsor rotor 60. Here, the turbine engine 56 may have a reverse flow engine arrangement.

Figure 4A:
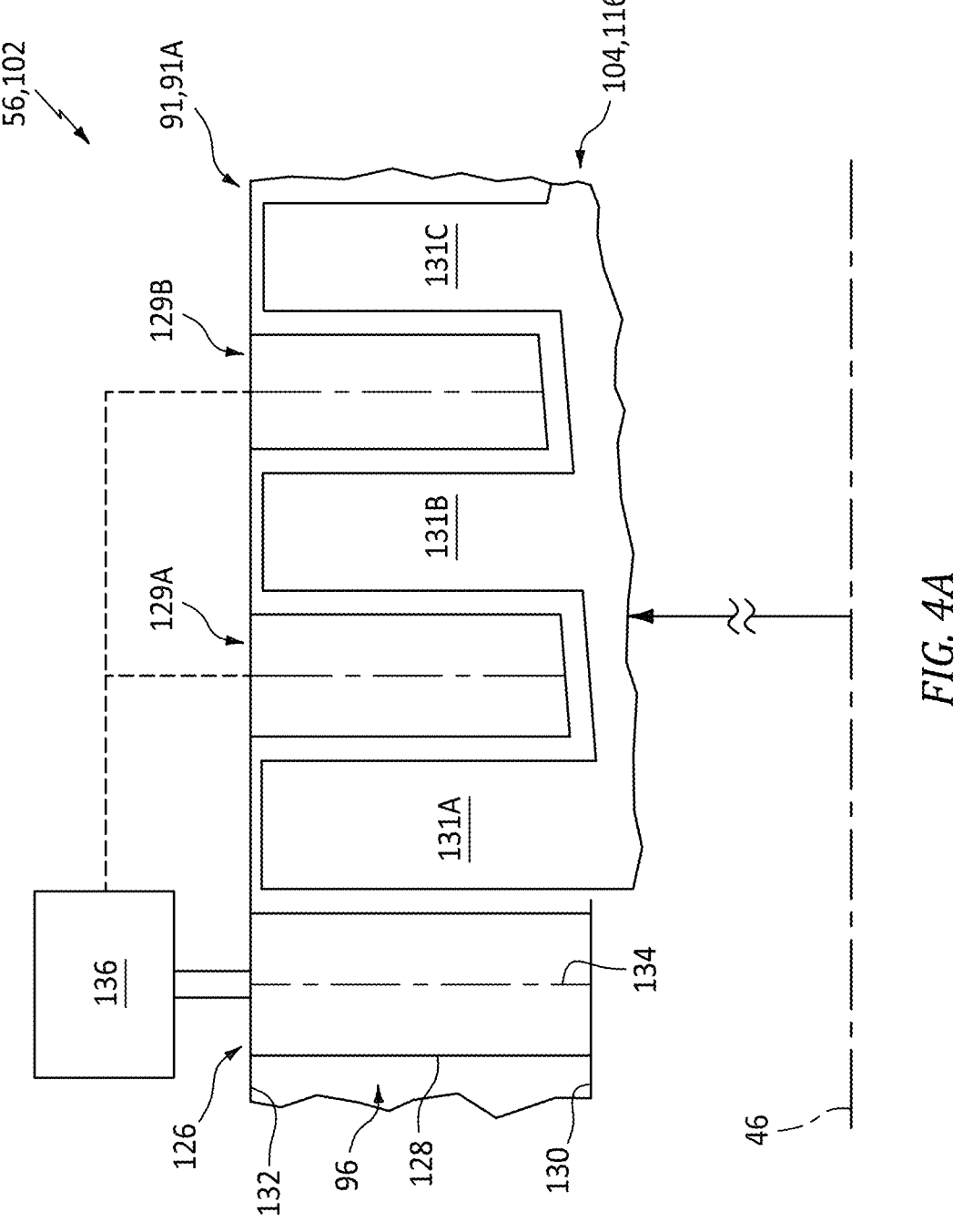
FIG. 4A is a side schematic illustration of a forward portion of an engine core.

Referring to FIG. 4, the turbine engine 56 may also include at least one variable pitch stator vane structure 126. This stator vane structure 126 may be configured as an inlet guide vane structure for the compressor section 91 and, more particularly, the LPC section 91A (see FIG. 3). The stator vane structure 126 of FIG. 4, for example, is disposed along the engine flowpath 96 upstream of the LPC rotor 104. More particularly, the stator vane structure 126 of FIG. 4 is disposed within the engine flowpath 96 next to and upstream of an upstream end of the LPC rotor 104. This stator vane structure 126 may also be disposed downstream of a fixed pitch core inlet vane structure 127 located at the flowpath inlet 98. The stator vane structure 126 is configured to condition (e.g., pre-swirl) the inner propulsor stream of air entering the LPC section 91A and/or change an effective flow area of the engine flowpath 96 into the LPC section 91A. Referring to FIG. 4A, the LPC section 91A may also include one or more arrays of variable guide vanes (e.g., 129A and 129B; generally referred to as "129") between neighboring LPC rotor stages (e.g., 131A and 131B, 131B and 131C) along the engine flowpath 96.

The stator vane structure 126 of FIG. 4 includes a plurality of stator vanes 128 (e.g., inlet guide vanes) that are arranged and may be equispaced circumferentially about the propulsion system axis 46 in an array; e.g., a circular array. Each of these stator vanes 128 extends spanwise along a span line of the respective stator vane 128 (e.g., radially relative to the propulsion system axis 46) across the engine flowpath 96 from an inner platform 130 of the stator vane structure 126 to an outer platform 132 of the stator vane structure 126. Here, a radial outer side of the inner platform 130 forms a radial inner peripheral boundary of the engine flowpath 96 through the stator vane structure 126. A radial inner side of the outer platform 132 forms a radial outer peripheral boundary of the engine flowpath 96 through the stator vane structure 126.

Each stator vane 128 of FIG. 4 is configured to pivot about a respective stator vane pivot axis 134. This stator vane pivot axis 134 extends radially relative to the propulsion system axis 46. The stator vane pivot axis 134 of FIG. 4, for example, is arranged perpendicular to the propulsion system axis 46 when viewed, for example, in the longitudinal reference plane. Each stator vane 128 of FIG. 4 is operatively coupled with a stator vane actuation system 136, which stator vane actuation system 136 may be discrete from or integrated as part of the blade actuation system 74 and/or the guide vane actuation system 88. The stator vane actuation system 136 is configured to pivot each stator vane 128 about its own respective stator vane pivot axis 134. By pivoting each stator vane 128 about its stator vane pivot axis 134, a pitch of the respective stator vane 128 may be changed. Referring to FIG. 4A, it is also contemplated the stator vane actuation system 136 may (or may not) also be configured to pivot each variable guide vane 129 in the LPC section 91A. Note, while the stator vane pivot axis 134 is shown in FIG. 4 as being perpendicular to the propulsion system axis 46, the present disclosure is not limited to such an exemplary arrangement. Moreover, it is contemplated some or all of the stator vanes 128 may alternatively be fixed pitch stator vanes in other embodiments and/or the stator vane structure 126 may be arranged at other locations along the engine flowpath 96; e.g., elsewhere downstream in the compressor section 91 of FIG. 3.

Figure 5:
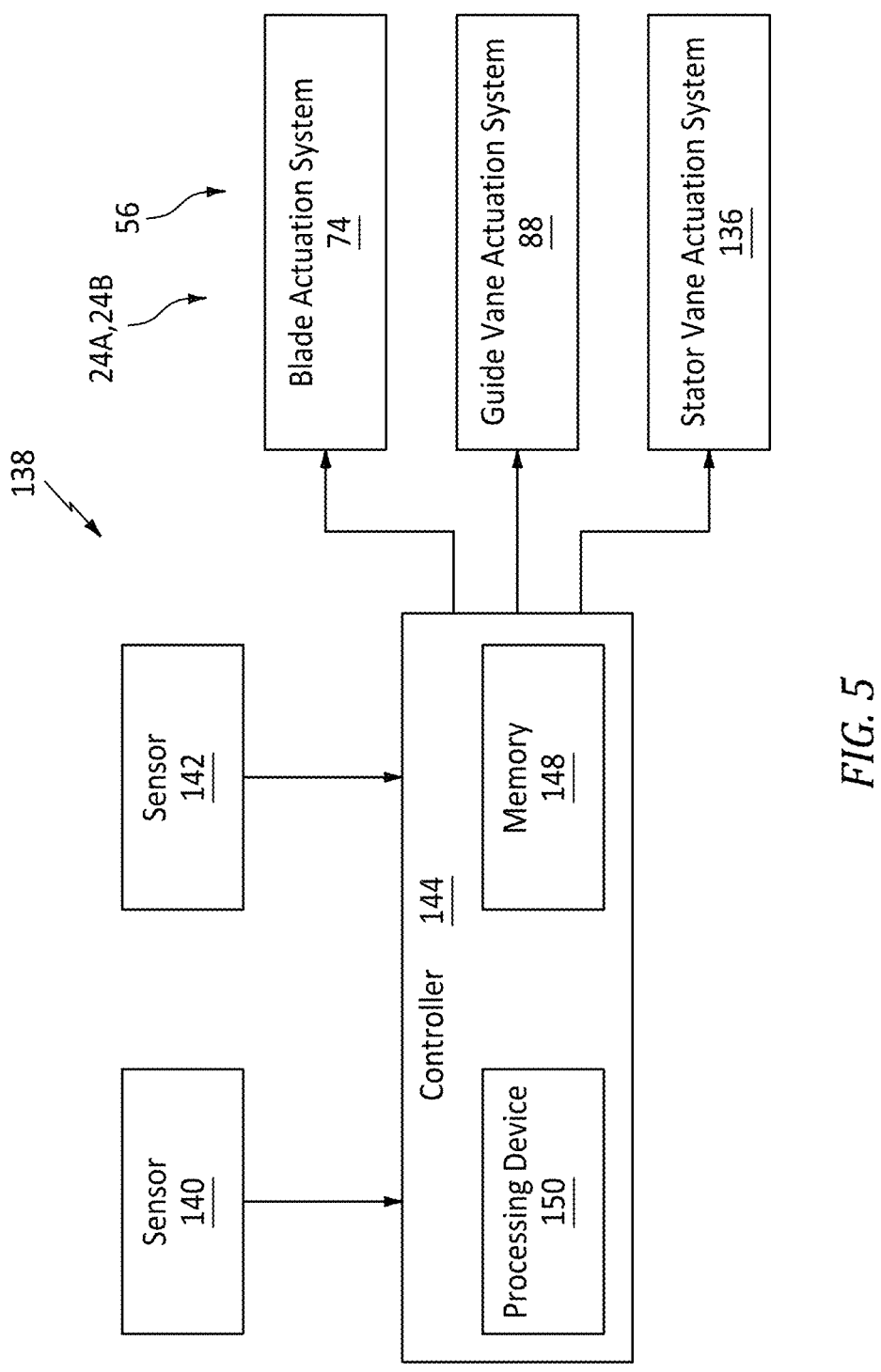
FIG. 5 is a schematic illustration of a control system with components of the propulsion system of FIG. 3.

Referring to FIG. 5, each aircraft propulsion system 24 is provided with a control system 138. This control system 138 is configured to monitor and/or control the operation of the respective aircraft propulsion system 24. The control system 138 of FIG. 5, for example, includes one or more sensors 140 and 142 (e.g., measurement probes) and a controller 144.

Figure 2:
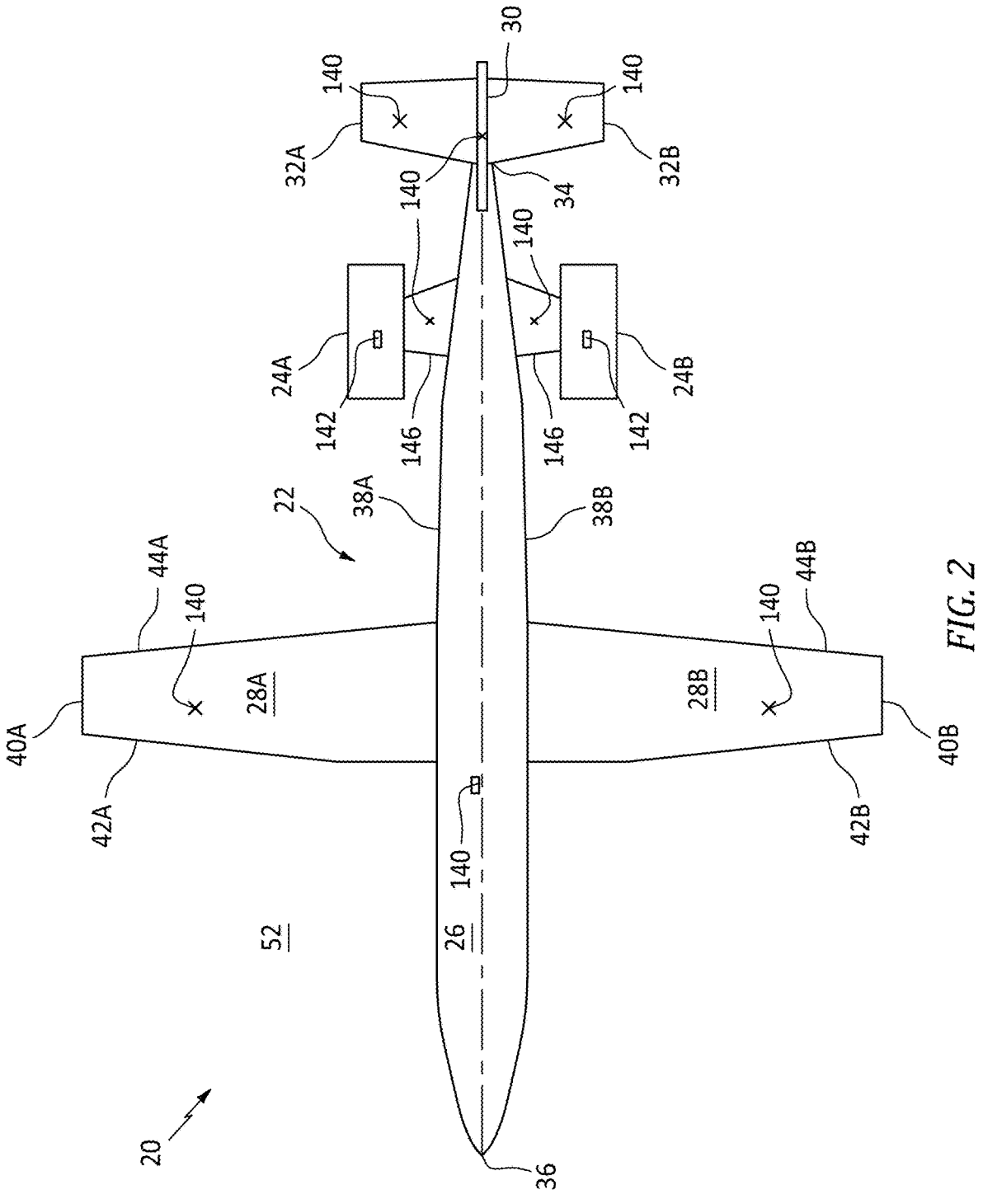
FIG. 2 is a schematic illustration of the aircraft with its propulsion systems mounted to a fuselage of the aircraft.

Each of the sensors 140 and 142 is configured to measure an environmental parameter external to the aircraft 20 and its aircraft propulsion systems 24 (see FIGS. 1 and 2). More particularly, each sensor 140, 142 is configured to measure an environmental parameter of the external environment 52 at a location of the respective sensor 140, 142. For example, each sensor 140, 142 may be configured as a temperature sensor which measures a temperature of the air in the external environment 52 at the respective sensor location. In another example, each sensor 140, 142 may be configured as a pressure sensor which measures a pressure of the air in the external environment 52 at the respective sensor location. Each sensor 140, 142 is also configured to provide (e.g., output) sensor data indicative of the measured environmental parameter. For example, where each sensor 140, 142 measures the air temperature in the external environment 52, the sensor data output from that sensor 140, 142 is indicative of the measured air temperature. In another example, where each sensor 140, 142 measures the air pressure in the external environment 52, the sensor data output from that sensor 140, 142 is indicative of the measured air pressure.

Referring to FIGS. 1 and 2, the first sensor 140 and the second sensor 142 may be arranged at different locations about the aircraft 20. By arranging these sensors 140 and 142 at their different sensor locations, one of the sensors 140, 142 may back up the other one of the sensors 142, 140 in an unlikely event of icing, foreign object damage (FOD), or any other sensor failure at one sensor location during aircraft flight. For ease of description, the first sensor 140 is described below as being arranged remote from the respective aircraft propulsion system 24, while the second sensor 142 is described below as being arranged with the respective aircraft propulsion system 24. The present disclosure, however, is not limited to such an exemplary arrangement. For example, the second sensor 142 may alternatively be arranged remote from the respective aircraft propulsion system 24, while the first sensor 140 is arranged with the respective aircraft propulsion system 24. In another example, both the first sensor 140 and the second sensor 142 may be arranged at different locations (or a common location) with the respective aircraft propulsion system 24. In still another example, both the first sensor 140 and the second sensor 142 may be arranged at different locations (or a common location) remote from the respective aircraft propulsion system 24.

The first sensor 140 may be arranged with and mounted to the aircraft airframe 22 at a location which is subject to or emersed in a free stream of air in the external environment 52. The first sensor 140 of FIGS. 1 and 2, for example, may be mounted to the aircraft fuselage 26 (schematically denoted by a box). In another example, the first sensor 140 may be mounted to a respective aircraft airfoil (schematically denoted by "x"); e.g., one of the aircraft wings 28, the vertical stabilizer 30, one of the horizontal stabilizers 32, etc. Alternatively, the first sensor 140 may be arranged closer to the respective aircraft propulsion system 24. The first sensor 140, for example, may be mounted to a pylon 146 (schematically denoted by "x"); e.g., a propulsion system mounting structure. This pylon 146 mounts the respective propulsion system 24 to another component of the aircraft airframe 22 such as a respective aircraft wing 28 (e.g., see FIG. 1) or the aircraft fuselage 26 (e.g., see FIG. 2).

The second sensor 142 may be arranged with and mounted to the respective aircraft propulsion system 24 (schematically denoted by a box). Referring to FIG. 4, the second sensor 142 may be arranged at a location which is subject to or emersed in a free stream of air in the external environment 52. The second sensor 142 of FIG. 4, for example, may be disposed axially upstream of the propulsor rotor 60 and mounted to the nose cone 64 (schematically denoted by a box). Alternatively, the second sensor 142 may be arranged at a location which is subject to or emersed in a propulsor stream of air in the external environment 52. The second sensor 142, for example, may be mounted to the housing structure 80 downstream of the propulsor rotor 60 (schematically denoted by "x"). More particularly, the second sensor 142 may be disposed at or near the flowpath inlet 98 axially between the propulsor rotor 60 and the guide vane structure 62 (schematically denoted by "x"). Alternatively, referring to FIG. 3, the second sensor 142 may be disposed along the nacelle 120 downstream of the guide vane structure 62.

Referring to FIG. 5, the controller 144 is in signal communication (e.g., hardwired and/or wirelessly coupled) with each of the sensors 140 and 142. The controller 144 is also in signal communication with the respective aircraft propulsion system 24. The controller 144 of FIG. 5, for example, is in signal communication with one or more aircraft propulsion system components such as, but not limited to, the blade actuation system 74, the guide vane actuation system 88 and/or the stator vane actuation system 136.

The controller 144 may be configured as an onboard engine controller for the respective aircraft propulsion system 24 and its turbine engine 56; e.g., an electronic engine controller (EEC), an electronic control unit (ECU), a full-authority digital engine controller (FADEC), etc. The controller 144 may be implemented with a combination of hardware and software. The hardware may include memory 148 and at least one processing device 150, which processing device 150 may include one or more single-core and/or multi-core processors. The hardware may also or alternatively include analog and/or digital circuitry other than that described above.

The memory 148 is configured to store software (e.g., program instructions) for execution by the processing device 150, which software execution may control and/or facilitate performance of one or more operations such as those described herein. The memory 148 may be a non-transitory computer readable medium. For example, the memory 148 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 6:
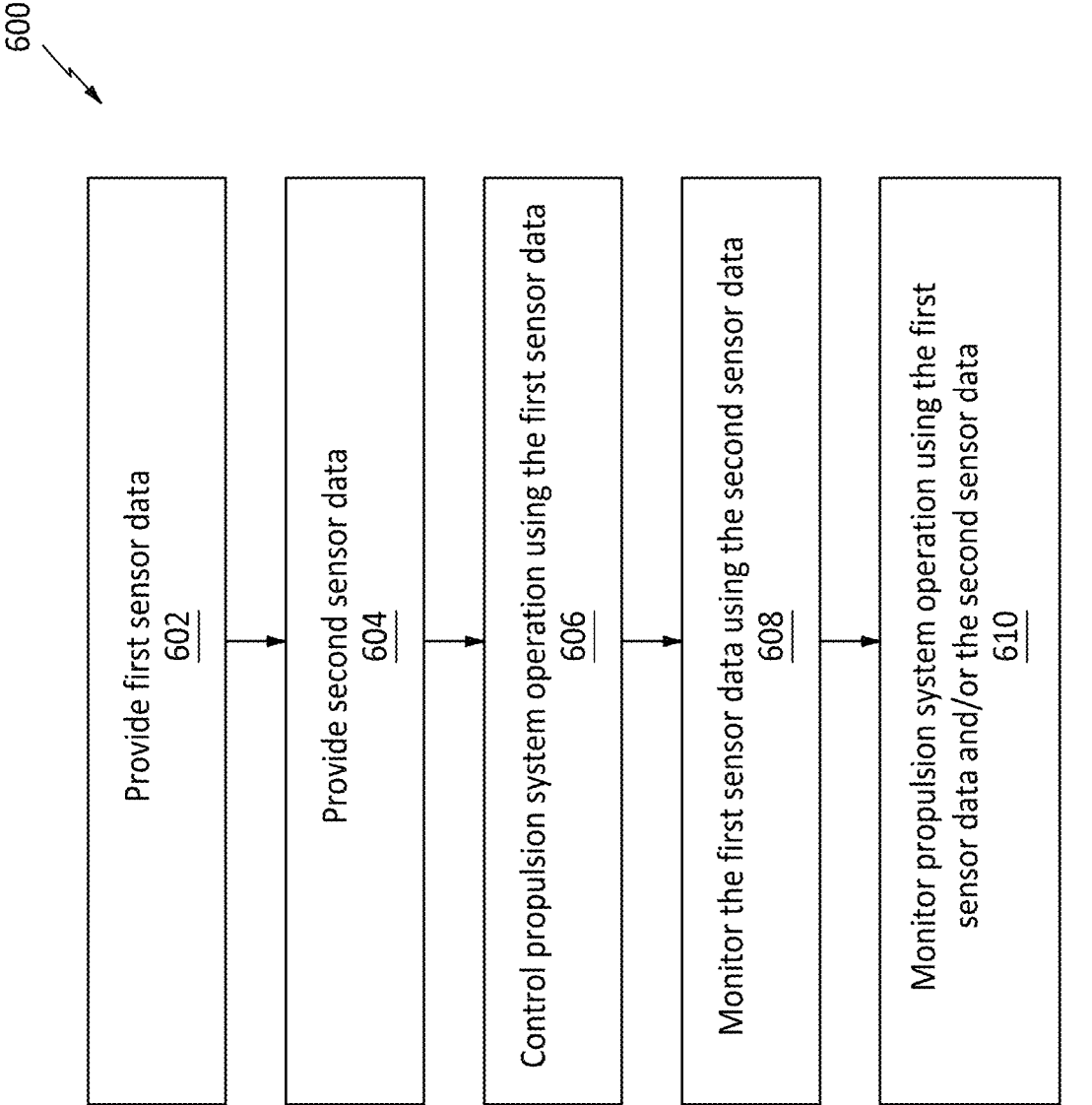
FIG. 6 is a flow diagram of a method for operating an aircraft propulsion system.

FIG. 6 is a flow diagram of a method 600 for operating an aircraft propulsion system. For ease of description, the operating method 600 is described below with respect to a respective one of the aircraft propulsion systems 24 described above. The present disclosure, however, is not limited to such exemplary aircraft propulsion systems.

In step 602, the first sensor 140 provides first sensor data. The first sensor 140, for example, measures a first operational parameter (e.g., air temperature or air pressure) of the airstream at its first sensor location; e.g., free stream air remote from the respective aircraft propulsion system 24. The first sensor 140 then communicates its first sensor data to the controller 144, where the first sensor data is indicative of the measured first operational parameter.

In step 604, the second sensor 142 provides second sensor data. The second sensor 142, for example, measures a second operational parameter (e.g., air temperature or air pressure) of the airstream at its second sensor location; e.g., free stream air upstream of the propulsor rotor 60, or propulsor stream air downstream of the propulsor rotor 60. The second sensor 142 then communicates its second sensor data to the controller 144, where the second sensor data is indicative of the measured second operational parameter. Note, while the step 604 is described as a separate step from the step 602, the steps 602 and 604 may be performed simultaneously.

In step 606, the controller 144 controls operation of the respective aircraft propulsion system 24 using the first sensor data. The controller 144, for example, may process the first sensor data (or data derived therefrom) using a control algorithm, a virtual model, a lookup table and/or other control scheme(s) to provide a respective control signal to one or more of the aircraft propulsion system components 74, 88 and/or 136. Each aircraft propulsion system component 74, 88, 136 may then operate according to its received control signal. The blade actuation system 74, for example, may (or may not) adjust the pitch of the propulsor blades 68 in response to receiving a respective control signal from the controller 144. The guide vane actuation system 88 may (or may not) adjust the pitch of the guide vanes 76 in response to receiving a respective control signal from the controller 144. The stator vane actuation system 136 may (or may not) adjust the pitch of the stator vanes 128 in response to receiving a respective control signal from the controller 144. The controller 144 may thereby control operation of the aircraft propulsion system component(s) 74, 88 and/or 136 based on at least the first sensor data (or data derived therefrom). Briefly, the first sensor data may more accurately represent actual free stream conditions compared to the second sensor data due to the locations of the first and the second sensors 140 and 142. The controller 144 may thereby more readily process the first sensor data for propulsion system operational control. However, in other embodiments, it is contemplated the use of the first sensor data and the second sensor data may be reversed during performance of one or more steps of the operating method 600.

In step 608, the controller 144 monitors the first sensor data using the second sensor data. The controller 144, for example, may compare the first sensor data (or data derived therefrom) to the second sensor data (or data derived therefrom) to identify if there are any faults in the first sensor data. For example, if the first sensor data is lower or higher than expected for the current flight conditions and/or propulsion system operating conditions, when viewed in light of the second sensor data, the controller 144 may determine there is a fault in the first sensor data and/or the first sensor 140. By contrast, if the first sensor data is within an expected threshold range for the current flight conditions and/or propulsion system operating conditions, the controller 144 may determine the first sensor data is accurate. Where the first sensor data is accurate (e.g., during a normal operating mode), the controller 144 may continue to use the first sensor data per step 606 to control operation of the respective aircraft propulsion system 24. However, where the first sensor data includes one or more faults (e.g., during a fault operating mode), the controller 144 may instead use the second sensor data for the step 606 to control operation of the respective aircraft propulsion system 24. In other words, the second sensor 142 may function as a backup sensor for the first sensor 140. Of course, it is also contemplated the controller 144 may identify a fault in the second sensor data. In such circumstances, the controller 144 may alternatively use the first sensor data instead of the second sensor data for any control functions which otherwise utilize the second sensor data rather than the first control data. Of course, it is contemplated both the first and the second sensors 140 and 142 may be faulty. In such circumstances, the controller 144 may determine the multi-sensor fault by comparing the sensor data to a historical map/data table of viable mission flight points.

In step 610, the controller 144 monitors operation of the respective aircraft propulsion system 24 using the first sensor data and/or the second sensor data. The controller 144, for example, may process the first sensor data and/or the second sensor data to determine if the aircraft propulsion system 24 or, more generally, the aircraft 20 may be experiencing icing conditions. In the event that the controller 144 determines there are icing conditions, the controller 144 may activate an anti-icing and/or deicing system for the aircraft propulsion system 24 or, more generally, the aircraft 20.

The control system 138 is described above with a single first sensor 140 at the first sensor location and a single second sensor 142 at the second sensor location for ease of description. In such embodiments, each sensor 140, 142 may be configured to measure a single environmental parameter; e.g., air pressure or air temperature. In other embodiments, however, each sensor 140, 142 may be configured to measure multiple environmental parameters; e.g., both air pressure and air temperature. In still other embodiments, multiple sensors 140 may be disposed at the first sensor location and multiple sensors 142 may be disposed at the second sensor location. Both air pressure and air temperature may thereby be measured for each sensor location. When both air pressure and air temperature are measured, the controller 144 may consider these environmental parameters individually or in combination during the performance of the operating method 600.

Figure 7:
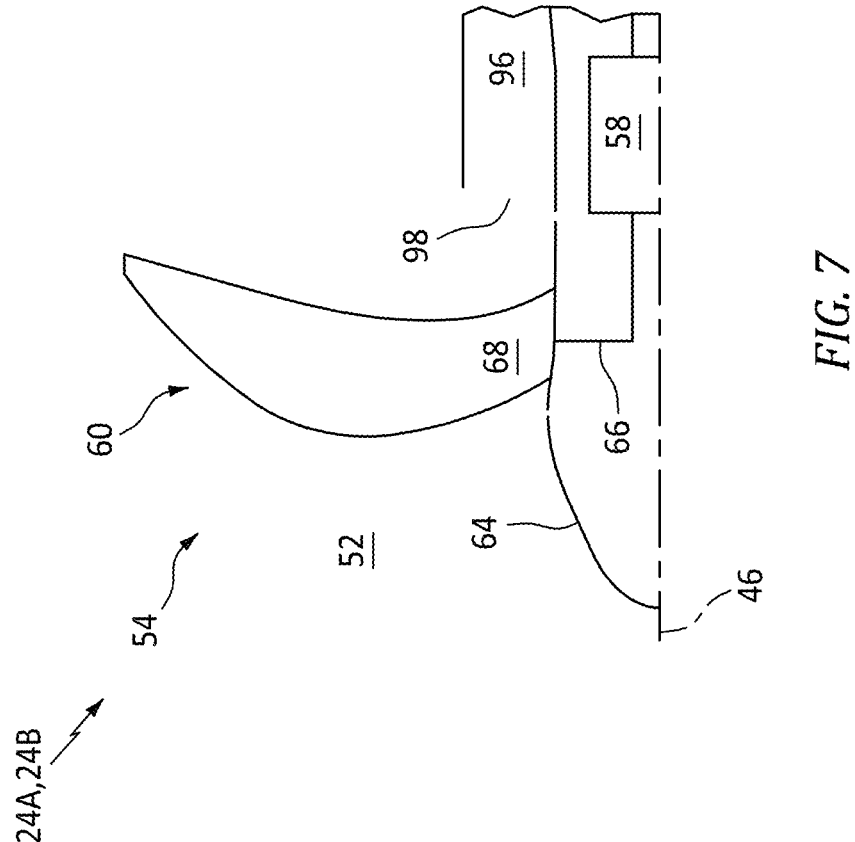
FIG. 7 is a partial schematic illustration of an exemplary one of the propulsion systems configured without a guide vane structure.

Referring to FIG. 3, while each of the aircraft propulsion systems 24A and 24B is described above as including the guide vane structure 62, the present disclosure is not limited to such an exemplary propulsion system configuration. For example, referring to FIG. 7, each aircraft propulsion system 24 may alternatively be configured without an open guide vane structure. Each aircraft propulsion system 24 of FIG. 7, for example, is configured as a single rotor (SR) open rotor propulsion system.

The propulsion section 54 of FIG. 3 is described above with a tractor configuration; e.g., where the propulsor rotor 60 is disposed at or otherwise near the propulsion system forward end 48. It is contemplated, however, the propulsion section 54 may alternatively be disposed at or otherwise near the propulsion system aft end 50 to provide a pusher fan configuration. Moreover, while the turbine engine 56 is described above with a particular two rotating structure arrangement, the present disclosure is not limited thereto. For example, the LPC rotor 104 may be omitted to configure the LPT rotor 107 as a power turbine (PT) rotor for the propulsor rotor 60. In another example, the turbine engine 56 may also include another rotating structure; e.g., an intermediate speed spool for the engine core 102.

The guide vane structure 62 is described above as a fixed (e.g., non-rotatable) guide vane structure. It is contemplated, however, the guide vane structure 62 may alternatively be selectively rotatable about the respective propulsion system axis 46. With such an arrangement, each aircraft propulsion system 24 may be configured as an open rotor propulsion system with a swirl recovery blade (SRB) open rotor architecture. More particularly, each aircraft propulsion system 24 may operate as: (A) a counter-rotating open rotor (CROR) propulsion system during a dual rotor mode of operation (e.g., when both the propulsor rotor 60 and the structure 62 are counter-rotating about the respective propulsion system axis 46); and (B) a single open rotor and swirl recovery vane (SRV) propulsion system during a single rotor mode of operation (e.g., when the propulsor rotor 60 is rotating and the structure 62 is rotationally fixed about the respective propulsion system axis 46). Note, when the guide vane structure 62 is configured to selectively rotate about the respective propulsion system axis 46, the moving guide vanes 76 operate as propulsor blades.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:

a propulsion system including an open propulsor rotor and a turbine engine configured to drive rotation of the open propulsor rotor about an axis; and a control system including a first sensor, a second sensor and a controller in signal communication with the first sensor and the second sensor, the first sensor configured to provide first sensor data indicative of a first environmental parameter, the second sensor mounted to the propulsion system and configured to provide second sensor data indicative of a second environmental parameter, the controller configured to monitor and/or control operation of the propulsion system using the first sensor data, and the controller further configured to monitor the first sensor data based on the second sensor data;

wherein the controller is configured to identify a fault in the first sensor data when the first sensor data is at least one of higher or lower than a threshold range when viewed in light of the second sensor data; and wherein the controller is further configured to monitor and/or control operation of the propulsion system using the second sensor data instead of the first sensor data when the fault is identified in the first sensor data.

2. The assembly of claim 1, wherein the control system is configured such that the first sensor is arranged remote from a stream of air propelled by the open propulsor rotor; and the second sensor is exposed to the stream of air propelled by the open propulsor rotor.

3. The assembly of claim 1, wherein the controller is configured to monitor and/or control operation of the propulsion system using the first sensor data during a first mode; and monitor and/or control operation of the propulsion system using the second sensor data during a second mode.

4. The assembly of claim 1, wherein the first environmental parameter is indicative of a first air pressure outside of the propulsion system; and the second environmental parameter is indicative of a second air pressure outside of the propulsion system.

5. The assembly of claim 1, wherein the first environmental parameter is indicative of a first air temperature outside of the propulsion system; and the second environmental parameter is indicative of a second air temperature outside of the propulsion system.

6. The assembly of claim 1, wherein the first environmental parameter is a first free stream environmental parameter outside of the propulsion system.

7. The assembly of claim 1, wherein the open propulsor rotor comprises a plurality of open propulsor blades;

the propulsion system further includes an actuation system configured to change a pitch of at least one of the plurality of open propulsor blades; and the controller is configured to control operation of the actuation system using the first sensor data.

8. The assembly of claim 1, wherein the propulsion system further includes an open guide vane structure axially next to the open propulsor rotor.

9. The assembly of claim 8, wherein the open guide vane structure comprises a plurality of open guide vanes;

the propulsion system further includes an actuation system configured to change a pitch of at least one of the plurality of open guide vanes; and the controller is configured to control operation of the actuation system using the first sensor data.

10. The assembly of claim 1, wherein the turbine engine comprises a plurality of stator vanes and an actuation system;

the actuation system is configured to change a pitch of at least one of the plurality of stator vanes; and the controller is configured to control operation of the actuation system using the first sensor data.

11. The assembly of claim 1, wherein the controller is configured to detect icing conditions using the first sensor data and/or the second sensor data.

12. The assembly of claim 1, wherein the propulsion system further includes a nose cone axially next to and upstream of the open propulsor rotor; and the second sensor is mounted with the nose cone.

13. The assembly of claim 1, wherein the propulsion system further includes an open guide vane structure axially next to the open propulsor rotor; and the second sensor is located axially between the open propulsor rotor and the open guide vane structure.

14. The assembly of claim 1, further comprising:

an airframe;

the propulsion system mounted to the airframe; and the first sensor mounted with the airframe remote from the propulsion system.

15. The assembly of claim 1, further comprising:

a pylon;

the propulsion system mounted to the pylon; and the first sensor mounted with the pylon.

16. The assembly of claim 1, further comprising:

an airframe comprising a fuselage and an airfoil;

the propulsion system mounted to the airframe; and the first sensor mounted with the fuselage or the airfoil.

17. An assembly for an aircraft, comprising:

a propulsion system including an open propulsor rotor and a turbine engine configured to drive rotation of the open propulsor rotor about an axis; and a control system including a first sensor, a second sensor and a controller in signal communication with the first sensor and the second sensor, the first sensor configured to provide first sensor data indicative of a first environmental parameter, the second sensor mounted to the propulsion system and configured to provide second sensor data indicative of a second environmental parameter, the controller configured to control operation of the propulsion system during a first mode based on the first sensor data, and the controller configured to control the operation of the propulsion system during a second mode based on the second sensor data as a replacement for the first sensor data;

wherein the first sensor data is within a threshold range when viewed in light of the second sensor data during the first mode; and wherein the first sensor data is at least one of lower or higher than the threshold range when viewed in light of the second sensor data during the second mode.

18. An assembly of an aircraft, comprising:

a propulsion system including a housing structure, an open propulsor rotor fixed to the housing structure, an open guide vane structure fixed to the housing structure, a nose cone, and a turbine engine, the open guide vane structure axially next to the open propulsor rotor, and the turbine engine configured to drive rotation of the open propulsor rotor about an axis; and a control system including a sensor and a controller in signal communication with the sensor, the sensor configured to provide sensor data indicative of an environmental parameter external to the propulsion system, and the controller configured to monitor and/or control operation of the propulsion system using the sensor data;

wherein the sensor is mounted with the propulsion system at a first location or a second location, the first location located on the housing structure and axially between the open propulsor rotor and the open guide vane structure, the open propulsor rotor is axially between the nose cone and the open guide vane structure, and the second location located on the nose cone.

* * * * *